Patented Jan. 17, 1933

1,894,819

UNITED STATES PATENT OFFICE

ALFRED W. GREGG AND RAYMOND H. FRANK, OF COLUMBUS, OHIO, ASSIGNORS TO THE BONNEY-FLOYD COMPANY, OF COLUMBUS, OHIO, A CORPORATION OF OHIO

WEAR RESISTING FERROUS ALLOY

No Drawing.  Application filed March 24, 1931.  Serial No. 525,031.

This invention relates to a novel and improved wear resisting ferrous alloy which we have developed for use in the construction and formation of machine parts that are, in use, subjected to friction, abrasion and other conditions tending to wear and render the same unfit for efficient service.

It has long been known that, for parts of machinery which must withstand severe wear, abrasion and shock, a relatively soft body of material such as steel, coated or surfaced with a much harder material, gives far superior results. The relatively softer body material has ideal properties to withstand shock without fracture, while the very hard surface will withstand the abrasion and wear to which it may be subjected. Cases in which our invention is especially applicable are, among many others, dipper teeth, bucket lips, tool points, well drilling bits, conveyor parts, crushing rolls and so forth. In most cases, these parts are made up of a relatively soft base metal such as cast, rolled or forged carbon or alloy steel which has inferior abrasion resistant properties. Our invention has particular reference to a material for applying a surface or coating on such cast, rolled or forged material to greatly increase its useful life under conditions of severe service.

The alloy to which this invention refers may be cast in suitable form to cover and protect the parts subjected to wear by attaching it thereto by welding, mechanical means or it may be prepared in the form of welding rod and applied to these parts by any welding process such as electric arc welding, oxy-acetylene welding and the like. The latter method is usually preferred, but our invention is not to be limited to this preferred method of application.

A composition which we have used successfully is as follows:

An alloy of approximately the following composition:

|  | Per cent |
|---|---|
| Tungsten | 10.00 |
| Chromium | 15.00 to 20.00 |
| Nickel | 2.00 |
| Carbon | 1.50 to 4.50 |
| Vanadium | 1.00 |
| Molybdenum | 1.00 | the balance being iron except for impurities such as phosphorous and sulphur which are incidental to the manufacture thereof.

When this alloy is produced commercially in the form of a welding rod, it possesses the ability to readily spread and flow over metallic base surfaces, which are to be covered or protected thereby, to secure a smooth application of the protective wear and oxidation resisting alloy.

What is claimed is:

1. An alloy of approximately the following composition: chromium 15.00% to 20.00%; tungsten 10.00%; molybdenum 1.00%; vanadium 1.00%; nickel 2.00%; carbon 2.50% to 4.50%, the balance being iron except for impurities such as phosphorus and sulphur, which are incidental to the manufacture thereof.

2. An alloy of approximately the following composition: chromium 10.00% to 20.00%; tungsten 10.00%; molybdenum 1.00%; vanadium 1.00%; nickel 2.00%; carbon 1.50% to 4.50%, the balance being iron except for impurities such as phosphorus and sulphur, which are incidental to the manufacture thereof.

3. An alloy of approximately the following composition: chromium 15% to 20%; tungsten 10%; molybdenum 1%; vanadium 1%; nickel 2%; carbon 1.50% to 4.50%, the balance being iron except for impurities incidental to manufacture.

4. A welding rod having the composition set out in claim 1.

5. A welding rod having the composition set out in claim 2.

6. A welding rod having the composition set out in claim 3.

In testimony whereof we affix our signatures.

ALFRED W. GREGG.
RAYMOND H. FRANK.